United States Patent Office 3,308,137
Patented Mar. 7, 1967

3,308,137
CYCLOPROPA-ANDROSTENONE COMPOUNDS
Peter John Palmer, Whitton, Twickenham, England, assignor to Parke, Davis & Company, Detroit, Mich., a corporation of Michigan
No Drawing. Filed Jan. 15, 1965, Ser. No. 425,948
Claims priority, application Great Britain, Feb. 4, 1964, 4,773/64
4 Claims. (Cl. 260—397.4)

This invention relates to novel chemical compounds and means for producing the same. More particularly, the invention relates to cyclopropa-[2α,3α]-androst-5-en-4-one compounds represented by the formula:

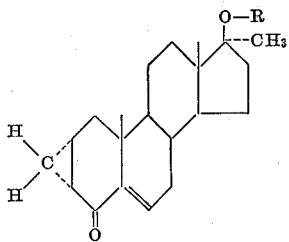

(I)

where R is hydrogen or a lower alkanoyl group of not more than four carbon atoms, preferably an acetyl group.

In accordance with the invention, compounds having the formula where R is a lower alkanoyl group are produced by reacting a 17α-methyl-17β-acyloxy-5α-hydroxycyclopropa-[2α,3α]-androstan-4-one compound of formula:

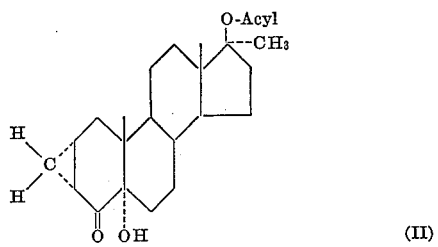

(II)

with thionyl chloride in the presence of pyridine; where acyl is a lower alkanoyl group of not more than four carbon atoms, preferably an acetyl group. The reaction is carried out at relatively low temperature, preferably from —10 to 30° C. and for best results from 0 to 5° C. At least one equivalent and preferably an excess, of thionyl chloride is employed.

In accordance with another embodiment of the invention, 17α-methyl-17β-hydroxycyclopropa-[2α,3α]-androst-5-en-4-one is produced by alkaline hydrolysis of compounds of Formula I where R is a lower alkanoyl group. For the hydrolysis, a basic agent such as an alkali metal or alkaline earth hydroxide, alkoxide or carbonate is employed, and the reaction is carried out in an aqueous medium containing an inert water-miscible organic solvent such as methanol, ethanol, dioxane or acetone. The reaction temperature may be varied widely but is ordinarily carried out in the range from 50 to 100° C. and preferably at the boiling point of the reaction mixture.

The compounds of the invention possess useful pharmacological properties. In particular, when administered by the oral or parenteral route, the compounds exhibit significant myotropic activity yet have relatively low androgenic side effects; hence, they have application as anabolic agents. The compounds are also useful as intermediates for the production of other steroids. A preferred anabolic agent of the invention is 17α-methyl-17β-hydroxycyclopropa-[2α,3α]-androst-5-en-4-one, acetate ester.

The 5α-hydroxycyclopropa-androstanone starting materials for the process of the invention can be prepared in four steps from 2-methylene-17α-methyl-17β-hydroxyandrost-4-en-3-one, as follows: the latter compound is reacted with hydrazine to form the 2α,3α-cyclopropa derivative, the cyclopropa compound is acylated at the 17-hydroxy position, the resulting ester is hydroxylated at the 4- and 5-positions by treatment with osmium tetroxide, and the resulting diol is converted to the corresponding 5α-hydroxyandrostan-4-one by oxidation with Jones reagent.

The invention is illustrated by the following examples.

*Example 1*

Thionyl chloride (0.5 ml.) is added dropwise to a stirred solution of 500 mg. of 17α-methyl-17β-acetoxy-5α-hydroxycyclopropa-[2α,3α]-androstan-4-one in 10 ml. of pyridine, maintained at 0 to 5° C. The reaction mixture is stirred for ten minutes at the same temperature and is then poured onto 50 g. of ice. The mixture is extracted with two 25-ml. portions of ether. The combined ether extract is washed in turn with dilute hydrochloric acid and with water and is then dried and concentrated by removal of ether. The residual product is 17α-methyl-17β - hydroxycyclopropa-[2α,3α]-androst-5-en-4-one, acetate ester; M.P. 155–159° C. after crystallization from acetone.

By replacing the 17β-acetoxy starting material in this procedure with an equivalent amount of the corresponding 17β-propionoxy compound, one obtains 17α-methyl-17β-hydroxycyclopropa - [2α,3α]-androst-5-en-4-one, propionate, ester.

The 17β-acetoxy starting material for the above procedure is prepared as follows: hydrazine hydrate (10 ml.) is added to diethylene glycol (150 ml.) and the solution heated to 180° C. under nitrogen. 2-methylene-17α-methyl-17β-hydroxyandrost-4-en-3-one (5 g.) is added and the solution is heated at reflux for 30 minutes. A solution of sodium (2 g.) in diethylene glycol (50 ml.) is added. The reaction temperature is increased to 210° C. and excess hydrazine hydrate removed by distillation. The solution is then heated at reflux for four hours and is finally cooled and poured into 500 ml. of water. The mixture is extracted with ether, dried and concentrated. The residual product, 17α-methyl-cyclopropa-[2α,3α]-androst-4-en-17β-ol, is purified by adsorption on alumina, elution with benzene and crystallization from acetone, M.P. 121–123° C. A solution of the androstenol (1 g.) in pyridine (5 ml.) and acetic anhydride (5 ml.) is refluxed for three hours, then cooled and poured into water (50 ml.). The mixture is extracted with ether, and the extract is washed in turn with dilute acid, water, dilute base, and water and then concentrated. The product, 17α-methylcyclopropa-[2,α3α]-androst-4-en-17β-ol, acetate ester (M.P. 78–80° C. from acetone), is dissolved in the amount of 871 mg. in ether (15 ml.) together with osmium tetroxide (1 g.) and pyridine (1 ml.) and allowed to stand overnight at room temperature. The resulting mixture is dissolved in methylene chloride and the solution saturated with hydrogen sulfide. The mixture is filtered, and the filtrate is washed with dilute acid, water, dilute base and water and then is dried and concentrated. The residual product, 17α-methyl-17β-acetoxy-4α,5α-dihydroxycyclopropa-[2α,3α]-androstane, is dissolved in acetone (50 ml.) at 0 to 5° C. One ml. of Jones reagent [chromium trioxide (26.72 g.) and sulfuric acid (23 ml.) diluted to 100 ml. with water] is added with stirring to this solution over a period of one minute. The mixture is stirred four minutes longer and is then diluted with methanol (25 ml.). The solution is concentrated to 10 ml., diluted with water (50 ml.) and extracted with ether. The extract is washed with water, aqueous sodium bicarbonate and water, and is then dried and concentrated. The residual product, 17α-methyl-17β-acetoxy-5α-hydroxycyclopropa-[2α,3α]-androstan-4-one, is purified by adsorption on alumina, elution with benzene, and crystallization from aqueous methanol, M.P. 201–203° C.

*Example 2*

A mixture of 17α-methyl-17β-hydroxycyclopropa-[2α,3α]-androst-5-en-4-one, acetate ester (0.5 g.) in ethanol (30 ml.) is treated with a solution of potassium hydroxide (1 g.) in water (10 ml.) and the mixture heated at reflux temperature for one hour. The reaction mixture is cooled and diluted with water (50 ml.). The resulting product, 17α-methyl-17β-hydroxycyclopropa-[2α,3α]-androst-5-en-4-one, is collected by filtration and crystallized from acetone. The same product is obtained by replacing the acetate ester starting material in this procedure with an equivalent amount of the corresponding propionate ester.

I claim:
1. Cyclopropa-[2α,3α]-androst-5-en-4-one compounds of the formula:

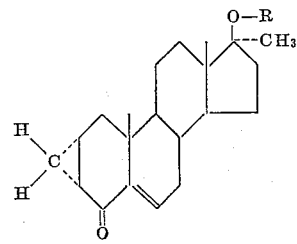

where R is a member of the group consisting of hydrogen and lower alkanoyl.
2. Products according to claim 1 where R is a lower alkanoyl group.
3. 17α-methyl-17β-hydroxycyclopropa-[2α,3α]-androst-5-ene-4-one, acetate ester.
4. 17α-methyl-17β-hydroxycyclopropa-[2α,3α]-androst-5-ene-4-one.

References Cited by the Examiner

Fudge et al.: Chem. Soc. Jour., pp. 958–64 (1954).

ELBERT L. ROBERTS, *Primary Examiner.*

LEWIS GOTTS, *Examiner.*

H. A. FRENCH, *Assistant Examiner.*